United States Patent
Wu et al.

(10) Patent No.: US 10,637,257 B2
(45) Date of Patent: Apr. 28, 2020

(54) DUAL BATTERY MOBILE TERMINAL AND WIRELESS CHARGING SYSTEM THEREOF

(71) Applicant: JRD COMMUNICATION (SHENZHEN) LTD., Shenzhen, Guangdong Province (CN)

(72) Inventors: Zewei Wu, Shenzhen (CN); Hongjie Tong, Shenzhen (CN); Zhiming Diao, Shenzhen (CN)

(73) Assignee: JRD COMMUNICATION (SHENZHEN) LTD., Shenzhen, Guangdong Province (CN)

( * ) Notice: Subject to any disclaimer, the term of this patent is extended or adjusted under 35 U.S.C. 154(b) by 173 days.

(21) Appl. No.: 15/571,034

(22) PCT Filed: Apr. 21, 2017

(86) PCT No.: PCT/CN2017/081440
§ 371 (c)(1),
(2) Date: Oct. 31, 2017

(87) PCT Pub. No.: WO2018/054049
PCT Pub. Date: Mar. 29, 2018

(65) Prior Publication Data
US 2018/0351372 A1    Dec. 6, 2018

(30) Foreign Application Priority Data

Sep. 20, 2016    (CN) .......................... 2016 1 0834069

(51) Int. Cl.
*H02J 7/00*    (2006.01)
*H02J 7/02*    (2016.01)
(Continued)

(52) U.S. Cl.
CPC .......... *H02J 7/0018* (2013.01); *H02J 7/0013* (2013.01); *H02J 7/0091* (2013.01); *H02J 7/025* (2013.01); *H02J 50/10* (2016.02); *H04M 1/725* (2013.01)

(58) Field of Classification Search
CPC ........ H02J 50/12; H02J 7/0018; H02J 7/0013; H02J 7/0091; H02J 7/025;
(Continued)

(56) References Cited

U.S. PATENT DOCUMENTS 9,431,848 B2 *  8/2016  Lee .......................... H02J 7/025
9,831,707 B2 * 11/2017  Nagatsuka .............. H02J 50/10
(Continued)

FOREIGN PATENT DOCUMENTS

CN        101610304 A     12/2009
CN        204361703 U      5/2015
(Continued)

*Primary Examiner* — Richard Isla
*Assistant Examiner* — Michael N Dibenedetto
(74) *Attorney, Agent, or Firm* — Cheng-Ju Chiang

(57) ABSTRACT

A dual battery mobile terminal and a wireless charging system are provided. The wireless charging system includes a main battery, a secondary battery, a wireless receive module and a charging control module. The wireless receive module senses a wireless charging signal, and converts the sensed wireless charging signal into a voltage and current signal. The charging control module in turn outputs the voltage and current signal outputted from the wireless receive module to charge the main battery or the secondary battery individually, or output the voltage and current signal to charge the main battery and the secondary battery simultaneously. Thereby, the control of the dual battery charging may be achieved.

18 Claims, 2 Drawing Sheets

(51) Int. Cl.
*H02J 50/10* (2016.01)
*H04M 1/725* (2006.01)

(58) Field of Classification Search
CPC .. H02J 50/10–90; H02J 7/0024; H02J 7/0031; H02J 7/0047; H02J 7/0014–0027; H04M 1/725
USPC ......................................... 320/108, 150–154
See application file for complete search history.

(56) References Cited

U.S. PATENT DOCUMENTS

| | | | | |
|---|---|---|---|---|
| 2005/0017677 | A1* | 1/2005 | Burton | H02J 7/025 320/108 |
| 2011/0241620 | A1* | 10/2011 | Lin | H02J 7/0018 320/112 |
| 2011/0279226 | A1 | 11/2011 | Chen et al. | |
| 2012/0280648 | A1* | 11/2012 | Hwang | H02J 7/0013 320/108 |
| 2012/0293117 | A1 | 11/2012 | Suzuki et al. | |
| 2014/0035535 | A1* | 2/2014 | Jung | H02J 5/005 320/150 |
| 2015/0050881 | A1 | 2/2015 | Chen et al. | |
| 2015/0303735 | A1* | 10/2015 | Kari | H01F 38/14 320/108 |
| 2016/0072536 | A1* | 3/2016 | Wang | H02J 7/025 455/566 |
| 2016/0250475 | A1* | 9/2016 | Marnfeldt | A61N 1/36125 607/61 |
| 2017/0005498 | A1* | 1/2017 | Pais | H02J 7/0072 |
| 2017/0025869 | A1* | 1/2017 | Lundholm | H02J 7/0013 |
| 2017/0104352 | A1* | 4/2017 | Stratton | H02J 7/0044 |
| 2017/0149256 | A1* | 5/2017 | Srinivasan | H02J 7/0021 |
| 2017/0366035 | A1* | 12/2017 | Meng | H01M 10/613 |

FOREIGN PATENT DOCUMENTS

| | | | | |
|---|---|---|---|---|
| CN | 104901436 A | | 9/2015 | |
| CN | 105244954 A | | 1/2016 | |
| CN | 105552988 A | * | 5/2016 | ............. H02J 7/025 |
| CN | 106356928 A | | 1/2017 | |
| EP | 2705877 A1 | | 3/2014 | |
| TW | 201141005 A1 | | 11/2011 | |

* cited by examiner

DUAL BATTERY MOBILE TERMINAL AND WIRELESS CHARGING SYSTEM THEREOF

CROSS-REFERENCE TO RELATED APPLICATIONS

The present application is a 35 U.S.C. § 371 National Phase conversion of International (PCT) Patent Application No. PCT/CN2017/081440 filed Apr. 21, 2017, which claims foreign priority of Chinese Patent Application No. 201610834069.3 filed on Sep. 20, 2016 in the State Intellectual Property Office of China, the contents of all of which are hereby incorporated by reference.

TECHNICAL FIELD

Embodiments of the present disclosure generally relate to charging technology, and in particular relate to a dual battery mobile terminal and a wireless charging system thereof.

BACKGROUND

Wireless charging technology (achieved by an electromagnetic induction mode) becomes mature gradually, and will be a mainstream of charging modes of smartphones in the future. Dual battery smartphones emerge with the requirement for longer battery life of the smartphone. However, there is still no technical solution as to how to control the charging of two batteries.

Therefore, the technical solution in the prior art needs to be improved and refined.

SUMMARY

Aiming at the defects in the prior art described above, the object of the present disclosure is to provide a dual battery mobile terminal and a wireless charging system thereof, which is capable of controlling the dual battery charging.

In order to solve the above technical problem, the present disclosure may adopt the following technical solutions:

A wireless charging system used in a dual battery mobile terminal is provided, wherein the dual battery mobile terminal comprises a main battery and a secondary battery; the wireless charging system comprises the following:

A wireless receive module is configured to sense a wireless charging signal, and convert the sensed wireless charging signal into a voltage and current signal.

A charging control module is configured to output the voltage and current signal outputted from the wireless receive module to charge the main battery or the secondary battery individually, or output the voltage and current signal to charge the main battery and the secondary battery simultaneously.

Wherein the wireless receive module is connected to the main battery and the secondary battery via the charging control module.

The wireless receive module comprises a wireless charging chip and an inductive coil configured to sense the wireless charging signal.

The charging control module comprises a temperature detection unit, a power supply switching unit and a control unit; wherein the temperature detection unit is configured to detect a temperature of the mobile terminal; the power supply switching unit is configured to switch on or off circuits between the wireless receive module and the main battery, and between the wireless receive module and the secondary battery based on a control signal from the control unit; the control unit is configured to charge the main battery and the secondary battery simultaneously via the power supply switching unit in the event that the temperature detected by the temperature detection unit is lower than a first preset temperature, and charge the main battery or the secondary battery individually via the power supply switching unit in the event that the temperature detected by the temperature detection unit is higher than the first preset temperature.

A voltage and current output terminal of the wireless receive module is connected to the main battery and the secondary battery via the power supply switching unit; the temperature detection unit and the power supply switching unit are respectively connected to the control unit.

Charging chips are respectively provided between the power supply switching unit and the main battery, and between the power supply switching unit and the secondary battery.

A wireless charging system used in a dual battery mobile terminal is provided, wherein the dual battery mobile terminal comprises a main battery and a secondary battery; the wireless charging system comprises the following:

A wireless receive module is configured to sense a wireless charging signal, and convert the sensed wireless charging signal into a voltage and current signal.

A charging control module is configured to output the voltage and current signal outputted from the wireless receive module to charge the main battery or the secondary battery individually, or output the voltage and current signal to charge the main battery and the secondary battery simultaneously.

Wherein the wireless receive module is connected to the main battery and the secondary battery via the charging control module.

A dual battery mobile terminal is provided, which comprises a wireless charging system used in a dual battery mobile terminal as described above.

Compared with the prior art, a dual battery mobile terminal and a wireless charging system are provided in the present disclosure. The wireless charging system includes a main battery, a secondary battery, a wireless receive module and a charging control module. The wireless receive module senses a wireless charging signal, and converts the sensed wireless charging signal into a voltage and current signal. The charging control module in turn outputs the voltage and current signal outputted from the wireless receive module to charge the main battery or the secondary battery individually, or output the voltage and current signal to charge the main battery and the secondary battery simultaneously. Thereby, the control of the dual battery charging may be achieved.

DETAILED DESCRIPTION

A dual battery mobile terminal and a wireless charging system thereof are provided in the present disclosure. In order to make the technical solution described in the embodiments of the present application more clearly and definitely, the technical solution of the present disclosure will be described in detail in connection with the drawings and embodiments. It should be understood that, the embodiments described below are only used for explanation, not for limitation.

A dual battery mobile terminal is provided in the present disclosure. The dual battery mobile terminal may include a main battery, a secondary battery, and a wireless charging system used in the dual battery mobile terminal. The dual battery mobile terminal may be a kind of electrical equipment having at least two batteries, such as a smartphone, a tablet computer, and the like.

Figure 1:
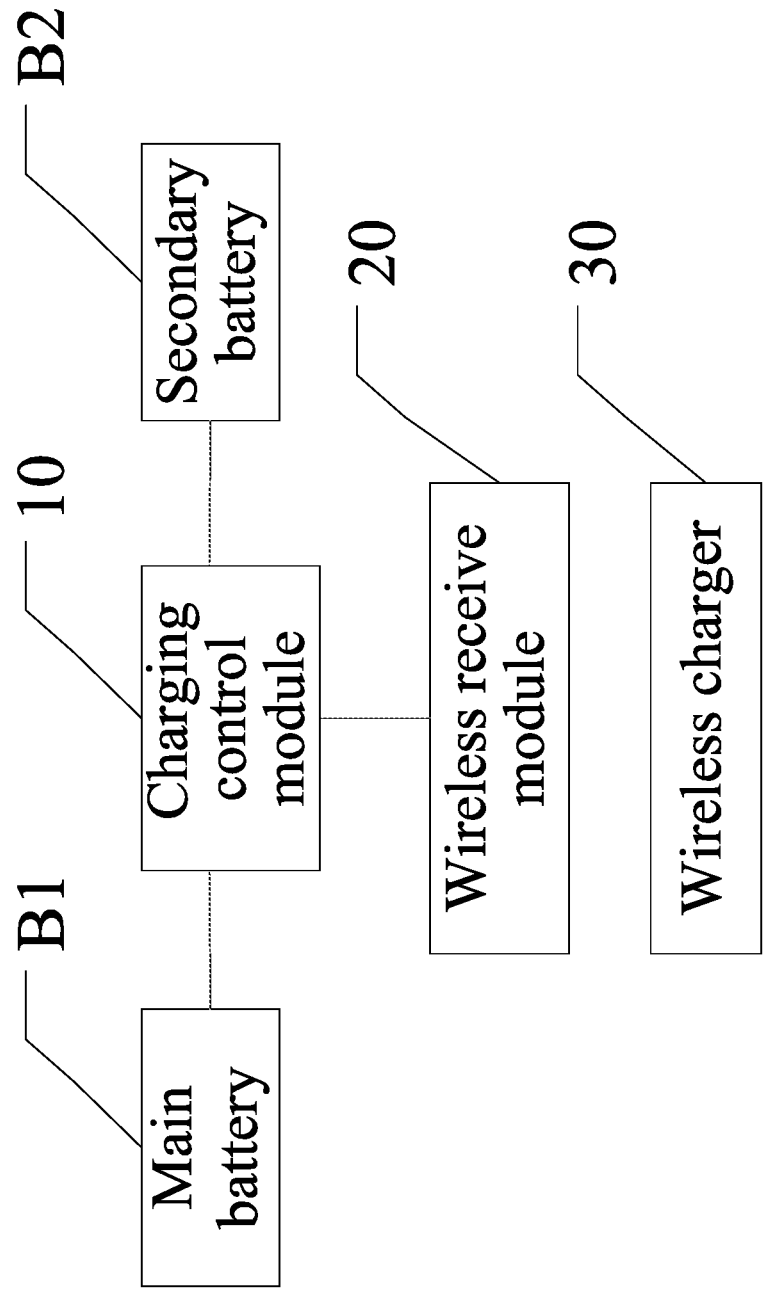
FIG. 1 is a block diagram showing a wireless charging system and a wireless charger used in a dual battery mobile terminal of the present disclosure.

Referring to FIG. 1, the wireless charging system may include a charging control module 10 and a wireless receive module 20. The wireless receive module 20 may be connected to the main battery B1 and the secondary battery B2 via the charging control module 10.

The wireless receive module 20 may be configured to sense a wireless charging signal from a wireless charger 30, and convert the sensed wireless charging signal into a voltage and current signal (a voltage signal and a current signal).

The charging control module 10 may be configured to output the voltage and current signal outputted from the wireless receive module 20 to charge the main battery B1/the secondary battery B2 individually, or output the voltage and current signal to charge the main battery B1 and the secondary battery B2 simultaneously.

In specific, the charging control module 10 may be specifically configured to output the voltage and current signal outputted from the wireless receive module 20 to charge the main battery B1 and the secondary battery B2 simultaneously in the event that a temperature of the mobile terminal is lower than a first preset temperature, and output the voltage and current signal outputted from the wireless receive module 20 to charge the main battery B1 or the secondary battery B2 individually in the event that the temperature of the mobile terminal is higher than the first preset temperature. In the present disclosure, charging modes may be switched based on the variation of the temperature. When the mobile terminal has a higher temperature, only one battery is charged; in this way, it is possible to avoid faults caused by an excessive high temperature, and thus the safety and reliability of the charging process may be ensured.

Furthermore, when the temperature of the mobile terminal is higher than a second preset temperature, the charging control module 10 may output the voltage and current signal outputted from the wireless receive module 20 to charge the secondary battery B2 individually. When the temperature of the mobile terminal is higher than the first preset temperature while lower than the second preset temperature, the charging control module 10 may output the voltage and current signal outputted from the wireless receive module 20 to charge the main battery B1 individually. The first preset temperature is lower than the second preset temperature. A capacity of the secondary battery B2 is generally smaller, and the temperature of the mobile terminal will be increased when the mobile terminal is charging the two batteries simultaneously at a lower temperature, since a current at the beginning of the charging is large. When the temperature of the mobile terminal is higher than the second preset temperature, the mobile terminal will only charge the battery having a smaller capacity, the charging current of the whole mobile terminal will in turn be decreased, and thus the temperature of the mobile terminal may be decreased. When the mobile terminal is at a temperature between the first preset temperature and the second preset temperature, the mobile terminal will only charge the main battery having a larger capacity; in this way, the temperature may be decreased below the first preset temperature, and the mobile terminal may recover to a state in which the two batteries are charged simultaneously. In this way, it is possible to adjust the charging modes of the mobile terminal based on the variation of the temperature, and to achieve a one-to-many charging solution, thereby improving the charging safety.

Figure 2:
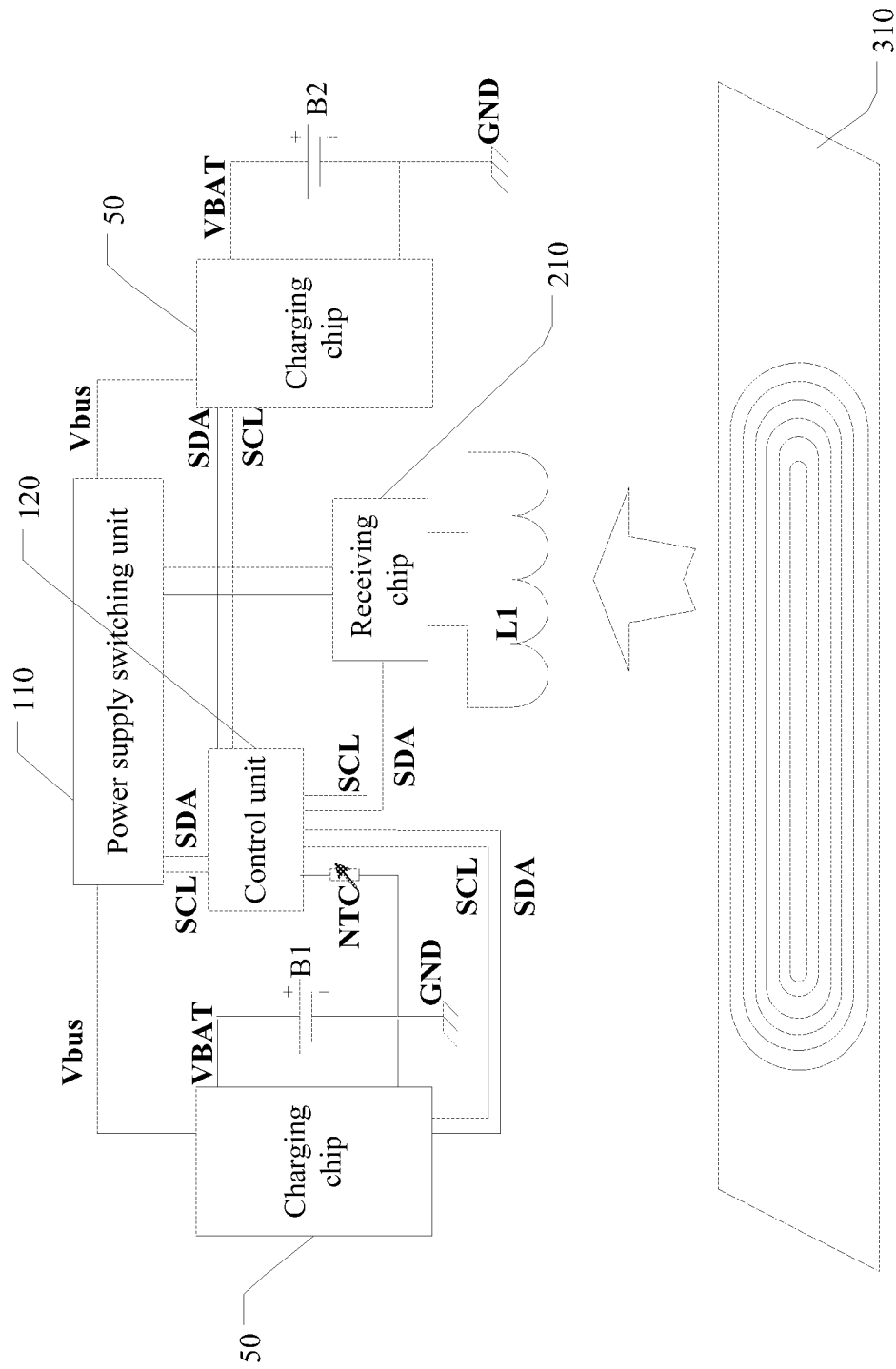
FIG. 2 is a schematic circuit diagram of the wireless charging system used in the dual battery mobile terminal of the present disclosure.

In connection with FIG. 2, the charging control module 10 may include: a temperature detection unit, a power supply switching unit 110 and a control unit 120. A voltage and current output terminal of the wireless receive module 20 may be connected to the main battery B1 and the secondary battery B2 via the power supply switching unit 110. The temperature detection unit and the power supply switching unit 110 may be respectively connected to the control unit 120.

The temperature detection unit may be configured to detect the temperature of the mobile terminal. In specific, the temperature detection unit may comprise a thermistor NTC, and the temperature of the mobile terminal may be detected by detecting a resistance value of the thermistor NTC.

The power supply switching unit 110 may be configured to switch on or off circuits between the wireless receive module 20 and the main battery B1, and between the wireless receive module 20 and the secondary battery B2, based on a control signal from the control unit 120. The power supply switching unit 110 may include a power supply switching chip.

The control unit 120 may be configured to charge the main battery B1 and the secondary battery B2 simultaneously via the power supply switching unit 110 in the event that the temperature detected by the temperature detection unit is lower than the first preset temperature, and individually charge the main battery B1 or the secondary battery B2 via the power supply switching unit 110 in the event that the temperature detected by the temperature detection unit is higher than the first preset temperature. Furthermore, the control unit 120 may be configured to individually charge the secondary battery B2 via the power supply switching unit 110 in the event that the temperature detected by the temperature detection unit is higher than the second preset temperature, and individually charge the main battery B1 via the power supply switching unit 110 in the event that the temperature detected by the temperature detection unit is at a temperature between the first preset temperature and the second preset temperature.

The wireless charger 30 may include a coil mainboard 310. A transmission circuit having a coil may be arranged on the coil mainboard 310.

The wireless receive module 20 may include a receiving chip (IC) 210 and an inductive coil L1 configured to sense the wireless charging signal. The inductive coil L1 may be connected to an input terminal of the receiving chip 210. An output terminal of the receiving chip 210 may be the voltage and current output terminal of the wireless receive module 20, and may be connected to the power supply switching unit 110. The receiving chip 210 may be mainly integrated with a rectifying filter circuit and a wireless charging IC. Optionally, BQ51020 manufactured by TI Corporation may be used as the receiving chip 210 in this embodiment.

Charging chips 50 may be provided between the power supply switching unit 110 and the main battery B1, and between the power supply switching unit 110 and the secondary battery B2. The charging chips 50 each may comprise a main IC implementing the charging of a mobile terminal and a peripheral circuit. Optionally, BQ24158 manufactured by TI Corporation may be used as the charging chips in this embodiment.

The control unit 120 may include a microcontroller (MCU), and the whole charge switching process may be controlled by the MCU via an I2C (Inter-Integrated Circuit) bus. That is to say, as is shown in fine lines where SCL and SDA are located in FIG. 2, the MCU may be connected to the power supply switching unit 110, the charging chips 50, and the receiving chip 210 via the I2C. Optionally, MT6755 manufactured by MTK Corporation may be used as the MCU in this embodiment.

Therefore, the wireless charging of the present disclosure may be achieved by electromagnetic induction. Electric energy may be converted into DC power supply via some circuits, such as the rectifying filter circuit and the like. The main battery and the secondary battery of the mobile terminal may be charged simultaneously via the power supply switching unit. The whole charge switching process may be controlled by the MCU via the I2C bus. Meanwhile, the MCU may control the receiving IC and the charging IC via the I2C bus. Furthermore, the NTC may be used to monitor the temperature of the whole mobile terminal, and the MCU may automatically switch the charging modes based on the temperature environment (charging the main battery or the secondary battery individually, or charging the main battery and the secondary battery simultaneously). The present disclosure discloses a one-to-many charging solution achieved by using the power supply switching unit; that is, the main battery and the secondary battery may be charged simultaneously. In this way, the charging efficiency may be improved, the design cost of the mainboard of the mobile terminal may be reduced, and the safety and the reliability of the charging process may be ensured.

The division of the functional modules described above is only used for explanation. In practical application, the functions may be achieved by different functional modules as required, that is, it is possible to divide the functional modules in other ways to achieve some or all of the functions described above.

One skilled in the art may understand that some or all of the processes described in the embodiments above may be implemented by corresponding hardware commanded by computer (or mobile terminal) programs. The computer (or mobile terminal) programs may be stored in a computer (or mobile terminal) readable storage medium. When executing the programs, the processes described in all of the embodiments above may be implemented. In this case, the storage medium may be implemented as a magnetic disk, a light disk, a read-only memory (ROM) or a random-access memory.

It could be understood that, one skilled in the art may make any equivalence or modification based on the technical solution and the inventive concept of the present disclosure. All these modifications and equivalences shall all be covered within the protection claimed in the claims of the present disclosure.

What is claimed is:

1. A wireless charging system used in a dual battery mobile terminal, the dual battery mobile terminal comprising a main battery and a secondary battery; the wireless charging system comprising:
a wireless receiver, configured to sense a wireless charging signal, and convert the sensed wireless charging signal into a voltage and current signal;
a charging controller, configured to output the voltage and current signal outputted from the wireless receiver to charge the main battery or the secondary battery individually, or output the voltage and current signal to charge the main battery and the secondary battery simultaneously;
wherein the wireless receiver is connected to the main battery and the secondary battery via the charging controller;
the wireless receiver comprises a wireless charging chip and an inductive coil configured to sense the wireless charging signal;
the charging controller comprises a temperature detector, a power supply switcher, and a controller, wherein: the temperature detector is configured to detect a temperature of the mobile terminal; the power supply switcher is configured to switch on or off circuits between the wireless receiver and the main battery, and between the wireless receiver and the secondary battery based on a control signal from the controller; the controller is configured to charge the main battery and the secondary battery simultaneously via the power supply switcher in the event that the temperature detected by the temperature detector is lower than a first preset temperature, charge the main battery individually via the power supply switcher in the event that the temperature detected by the temperature detector is at a temperature between the first preset temperature and a second preset temperature, and charge the secondary battery individually via the power supply switcher in the event that the temperature detected by the temperature detector is higher than the second preset temperature, wherein a capacity of the secondary battery is smaller than that of the main battery;
a voltage and current output terminal of the wireless receiver is connected to the main battery and the secondary battery via the power supply switcher; the temperature detector and the power supply switcher are respectively connected to the controller;
charging chips are respectively provided between the power supply switcher and the main battery, and between the power supply switcher and the secondary battery.

2. The wireless charging system used in the dual battery mobile terminal as described in claim 1, wherein the temperature detector comprises a thermistor.

3. The wireless charging system used in the dual battery mobile terminal as described in claim 1, wherein the power supply switcher comprises a power supply switching chip.

4. The wireless charging system used in the dual battery mobile terminal as described in claim 1, wherein the controller comprises a microcontroller.

5. A wireless charging system used in a dual battery mobile terminal, the dual battery mobile terminal comprising a main battery and a secondary battery; the wireless charging system comprising:
a wireless receiver, configured to sense a wireless charging signal, and convert the sensed wireless charging signal into a voltage and current signal;
a charging controller, configured to output the voltage and current signal outputted from the wireless receiver to charge the main battery and the secondary battery simultaneously in the event that the temperature of the mobile terminal is lower than a first preset temperature, charge the main battery individually in the event that the temperature detected by the temperature of the mobile terminal is at a temperature between the first preset temperature and a second preset temperature, and charge the secondary battery individually in the event that the temperature of the mobile terminal is higher than the second preset temperature, wherein a capacity of the secondary battery is smaller than that of the main battery;

the wireless receiver being connected to the main battery and the secondary battery via the charging controller.

6. The wireless charging system used in the dual battery mobile terminal as described in claim 5, wherein the charging controller comprises a temperature detector, a power supply switcher, and a controller, wherein:

the temperature detector is configured to detect a temperature of the mobile terminal;

the power supply switcher is configured to switch on or off circuits between the wireless receiver and the main battery, and between the wireless receiver and the secondary battery based on a control signal from the controller;

the controller is configured to charge the main battery and the secondary battery via the power supply switcher;

wherein a voltage and current output terminal of the wireless receiver is connected to the main battery and the secondary battery via the power supply switcher;

the temperature detector and the power supply switcher are respectively connected to the controller.

7. The wireless charging system used in a dual battery mobile terminal as described in claim 5, wherein the wireless receiver comprises a wireless charging chip and an inductive coil configured to sense the wireless charging signal.

8. The wireless charging system used in a dual battery mobile terminal as described in claim 6, wherein charging chips are respectively provided between the power supply switcher and the main battery, and between the power supply switcher and the secondary battery.

9. The wireless charging system used in a dual battery mobile terminal as described in claim 6, wherein the temperature detector comprises a thermistor.

10. The wireless charging system used in a dual battery mobile terminal as described in claim 6, wherein the power supply switcher comprises a power supply switching chip.

11. The wireless charging system used in a dual battery mobile terminal as described in claim 6, wherein the controller comprises a microcontroller.

12. A dual battery mobile terminal, comprising a wireless charging system as described in claim 5.

13. The dual battery mobile terminal as described in claim 12, wherein the charging controller comprises a temperature detector, a power supply switcher, and a controller, wherein:

the temperature detector is configured to detect a temperature of the mobile terminal;

the power supply switcher is configured to switch on or off circuits between the wireless receiver and the main battery, and between the wireless receiver and the secondary battery based on a control signal from the controller;

the controller is configured to charge the main battery and the secondary battery via the power supply switcher;

wherein a voltage and current output terminal of the wireless receiver is connected to the main battery and the secondary battery via the power supply switcher;

the temperature detector and the power supply switcher are respectively connected to the controller.

14. The dual battery mobile terminal as described in claim 13, wherein the wireless receiver comprises a wireless charging chip and an inductive coil configured to sense the wireless charging signal.

15. The dual battery mobile terminal as described in claim 13, wherein charging chips are respectively provided between the power supply switcher and the main battery, and between the power supply switcher and the secondary battery.

16. The dual battery mobile terminal as described in claim 13, wherein the temperature detector comprises a thermistor.

17. The dual battery mobile terminal as described in claim 13, wherein the power supply switcher comprises a power supply switching chip.

18. The dual battery mobile terminal as described in claim 13, wherein the controller comprises a microcontroller.

* * * * *